United States Patent [19]

Hasenbein et al.

[11] Patent Number: 4,948,850

[45] Date of Patent: Aug. 14, 1990

[54] PREPARATION OF AMINE-MODIFIED ETHYLENE/CARBOXYLIC ACID COPOLYMERS, SUCH COPOLYMERS, AND USE THEREOF AS ADHESION PROMOTERS AND CABLE SHEATHING

[75] Inventors: Norbert Hasenbein, Dirmstein; Thomas Muehlenbernd, Heidelberg; Gernot Koehler, Worms, all of Fed. Rep. of Germany

[73] Assignee: BASF Aktiengesellschaft, Ludwigshafen, Fed. Rep. of Germany

[21] Appl. No.: 461,424

[22] Filed: Jan. 5, 1990

Related U.S. Application Data

[62] Division of Ser. No. 400,529, Aug. 30, 1989.

[30] Foreign Application Priority Data

Sep. 3, 1988 [DE] Fed. Rep. of Germany ....... 3830007

[51] Int. Cl.$^5$ .............................................. C08F 8/32
[52] U.S. Cl. .................................. 526/217; 525/327.6; 525/329.5; 525/329.6; 525/329.9; 525/379; 526/272; 526/318.25; 526/318.6
[58] Field of Search .................... 526/217, 272, 318.25, 526/318.6; 525/327.6, 329.5, 329.6, 329.9

[56] References Cited

U.S. PATENT DOCUMENTS

| Re. 23,515 | 8/1976 | Gross | 526/217 |
|---|---|---|---|
| 3,201,374 | 8/1965 | Simms | 526/217 |
| 3,350,372 | 10/1967 | Auspon et al. | 260/86.7 |
| 3,404,134 | 10/1968 | Rees | 260/78.5 |
| 3,471,460 | 10/1969 | Rees | 260/88.1 |
| 3,520,861 | 7/1970 | Thomson et al. | 260/88.1 |
| 3,541,033 | 11/1970 | Buttrick et al. | 260/8 |
| 3,790,521 | 2/1974 | McCann et al. | 260/29.6 |
| 3,972,903 | 8/1976 | Voss et al. | 526/217 |
| 4,690,981 | 9/1987 | Statz | 525/329.6 |
| 4,801,649 | 1/1989 | Statz | 525/183 |

FOREIGN PATENT DOCUMENTS

115190 9/1987 European Pat. Off. .
760178 10/1958 United Kingdom .

*Primary Examiner*—Bernard Lipman
*Attorney, Agent, or Firm*—Keil & Weinkauf

[57] ABSTRACT

A high molecular weight ethylene copolymer is prepared by high-pressure copolymerization of ethylene with an α,β-ethylenically unsaturated carboxylic acid, carboxylic anhydride or a derivative thereof in the presence of a tertiary organic monoamine, preferably from 10 to 100 mol % thereof, based on the unsaturated carboxylic acid used, and can be used for preparing adhesion promoters and cable sheathing.

1 Claim, No Drawings

PREPARATION OF AMINE-MODIFIED ETHYLENE/CARBOXYLIC ACID COPOLYMERS, SUCH COPOLYMERS, AND USE THEREOF AS ADHESION PROMOTERS AND CABLE SHEATHING

This application is a division of application Ser. No. 400,529, filed on Aug. 30, 1989.

The present invention relates to a process for preparing high molecular weight ethylene copolymers having melt flow indices of less than 40 g/10 min by copolymerization of ethylene with α,β-ethylenically unsaturated carboxylic acids, carboxylic anhydrides and/or derivatives thereof in a polymerization system under pressures of 500 to 5,000 bar and temperatures of from 40 to 350° C. in the presence of free-radical polymerization initiators and in the presence of absence of molecular weight regulators.

Such processes give rise to high molecular weight carboxyl-containing ethylene copolymers which can be used as adhesion promoters or in cable sheathing or, after neutralization with organic or inorganic salts, can be converted into ionomers.

It is already known to prepare high molecular weight amine-modified copolymers of ethylene and α,β-ethylenically unsaturated carboxylic acids, carboxylic anhydrides and/or derivatives thereof of ionomeric character by preparing first of all a copolymer of ethylene and an α,β-ethylenically unsaturated carboxylic acid (for example esters described in U.S. Pat. Nos. 3,520,861, 3,201,374 and 3,350,372, and reacting this copolymer with a monoamine in a second, separate reaction step (cf. for example U.S. Pat. Nos. 3,404,134, 3,471,460, 3,541,033 and 3,790,521).

Although amine-modified copolymers prepared in such a way have in some instances good application properties, such as good electrical insulating properties, their homogeneity frequently leaves something to be desired. More particularly films produced therefrom still contain fisheyes, and the breaking strengths are inadequate. Moreover, the preparation of starting copolymers is fairly difficult owing to the very different copolymerization parameters of ethylene and carboxylic acid, for example acrylic acid, and frequently requires special technical measures (cf. U.S. Pat. No. 4,690,981 and EP-B1-0,115,190). The subsequent conversion to the ionomer is similarly difficult. According to EP-A-193,110, it is necessary to use extremely long reaction extruders which, to obtain good homogeneity, must additionally be equipped as two-screw extruders. However, such complicated and costly reaction apparatus is not always available. Furthermore, the remelting with shearing is very stressful for the polymer, and it degrades or undergoes irreversible crosslinking.

It is also already known in the art of copolymerizing ethylene with other unsaturated compounds at high pressure and high temperature in the presence of polymerization initiators to add a polymerization inhibitor to the ethylene prior to compression to prevent premature polymerization of the ethylene. Such additives can be substituted phenylamines, for example triphenylamine (cf. GB-A-760,178). The polymerization inhibitors are present in very small amounts, and their use in the copolymerization of ethylene with acrylic acid has not been tried.

Furthermore, it is already known from EP-A-223,182 to prepare ionomer-modified ethylene/carboxylic acid copolymers by copolymerization under high pressure conditions in the presence of a salt of a carboxylic acid, although the products are only the relatively inhomogeneous metal salts of the corresponding copolymers.

It is an object of the present invention to provide a process for preparing amine-modified high molecular weight ethylene copolymers, wherein the preparation takes place in a single step and wherein the products possess increased homogeneity, excellent gloss, good transparence and film puncture resistance.

We have found that this object is achieved by the process described at the beginning, except that according to the invention the copolymerization is carried out in the additional presence of a tertiary organic monoamine.

It is advantageous to carry out the copolymerization in the presence of not less than 10 mol % or a small mole excess of amine, based on the amount of unsaturated carboxylic acid compound.

Preferably, the copolymerization is carried out in the presence of from 10 to 100, in particular from 30 to 95 mol %, based on the unsaturated carboxylic acid compound used, of the tertiary organic amine.

We found that this object is also achieved by high molecular weight ethylene copolymers modified with tertiary monoamines by the above process.

The copolymerization can be carried out in any desired high pressure polymerization reactor. Possibilities are autoclaves, autoclave/tube reactor combinations and in particular simple single-zone tube reactors. This is surprising, since the preparation of reasonably homogeneous ethylene copolymers without prior amine modification can otherwise only be carried out in an autoclave, in particular at high comonomer concentrations.

Although the tubular reactor which is preferred according to the invention is a single-zone tube reactor, it is also possible to use other reactors, for example tube reactors with cold gas replenishment, autoclaves or combinations thereof.

The free-radical polymerization initiator for the copolymerization by the present process is preferably tert-butyl peroxypivalate or tert-butyl perisononanoate. It is also possible to use any other desired peroxides or peroxide combinations and/or oxygen as initiators. In addition, it is possible to use customary molecular weight regulators such as propionaldehyde.

A suitable inert solvent for the tert-butyl peroxypivalate or the other peroxides is an aliphatic hydrocarbon such as octane or a hydrocarbon mixture, for example naphtha. It is also possible in certain circumstances to use other inert solvents, such as chlorobenzene, cyclohexane or methanol. The amount of solvent required for introducing the initiator is small in relation to the amount of ethylene and is in general in each case from 0.01 to 5% by weight, preferably from 0.1 to 2% by weight, based on the amount of ethylene. This initiator-containing solution is metered direct into the reaction mixture, advantageously with the acid of high-speed metering pumps (cf. EP-A-101,875).

In the preferred procedure, ethylene is metered together with a mixture of the tertiary amine and an α,β-ethylenically unsaturated carboxylic acid or anhydride and/or a derivative thereof, preferably acrylic acid and methacrylic acid, in particular acrylic acid, on the intake side of a high-performance compressor where the mixture of ethylene, amine and comonomers is compressed to reaction pressure.

The copolymerization of ethylene with the other, carboxylic acid compound takes place as usual at pressures of from 500 to 5,000 bar, preferably from 1500 to 3,000 bar. The temperatures in the polymerization system range from 40 to 350° C., preferably from 100 to 350° C. The average residence times customarily range from 30 to 120 seconds, the average residence time being defined by the ratio of the apparatus volume to the volume of product passing on average through the apparatus volume per unit time. The conditions in the polymerization system are best realized in a tube reactor. A tube reactor is a tubular polymerization vessel which for more than 2,000 times, preferably from 5,000 to 50,000 times, longer than wide. Preferably, some of the polymerization heat is conducted away by cooling the tube reactor from the outside with water. The polymerization of ethylene with a comonomer in the tube reactor is carried out continuously (cf. "Ullmann's Encyklopädie der technischen Chemie", Verlag Chemie GmbH, D-6940 Weinheim, Volume 19, (1980), pages 169 to 195).

A suitable ethylenically unsaturated carboxylic acid or derivative thereof is in particular maleic acid, fumaric acid, itaconic acid, acrylic acid, acrylic anhydride, methacrylic acid, crotonic acid, maleic anhydride or itaconic anhydride. Preferred compounds are methacrylic acid and acrylic acid, in particular acrylic acid. The comonomer is copolymerized in amounts of from 1 to 30, preferably from 1 to 5% by weight, based on the ethylene copolymer.

In the process according to the invention, the copolymerization includes in addition to the initiator and any molecular weight regulator the presence of a tertiary organic monoamine, advantageously in amounts of from 10 to about 100 mol %, preferably from 30 to 95 mol %, based on the unsaturated carboxylic acid compound used.

Suitable amines are in particular aliphatic tertiary organic amines, preferably trialkylamines having from 1 to 18 carbon atoms in the alkyl radical, such as trimethylamine, triethylamine, tri-n-propylamine, tri-n-butylamine or dimethyl($C_{10}/C_{18}$-alkyl)amine, of which tributylamine and dimethyl($C_{10}/C_{18}$-alkyl)amine, but in particular the latter, are preferred. The name dimethyl($C_{10}/C_{18}$-alkyl)amine here covers N,N-dimethyl-N-alkylamines where the alkyl contains from 10 to 18 carbon atoms and usually constitutes a mixture of such alkyls. This amine can be present in up to a small molar excess, i.e. an excess of about 15 mol %, over the ethylenically unsaturated carboxylic acid, but preferably the amine is present in a deficient amount.

The amine-modified ethylene copolymer according to the invention has a melt flow index of less than 40, preferably from 4 to 40 g/10 min as defined by German Standard Specification DIN 53735. The density of the copolymer is freely choosable and is preferably within the range from 0.922 to 0.928 g/cm$^3$.

The advantages obtained with the invention are in particular that amine-modified ethylene copolymers can be prepared in a single step and that these copolymers show improved homogeneity compared with similar copolymers. Films produced from the copolymer prepared according to the invention possess excellent puncture resistance, gloss and transparence and are free from fisheyes. The copolymer can be used for preparing adhesion promoters or cable sheathing. The use of ethylene/acrylic acid copolymers for preparing adhesion promoters or cable sheathing is known per se and described for example in U.S. Pat. No. 4,092,488, DE-A-3,607,756, GB-A-2,081,723 and U.S. Pat. No. 4,487,885.

The Examples which follow describe the process according to the invention in more detail.

EXAMPLES

The copolymerization was in all cases carried out in a tubular reactor having a length/diameter ratio of about 25,000. The heat of polymerization was removed by water-cooling the tube walls from the outside. The ethylene/amine/carboxylic acid mixture was admixed with propionaldehyde as molecular weight regulator, compressed to reaction pressure and fed to the inlet point of the reactor. In addition, a solution of tert-butyl peroxypivalate and tert-butyl perisononanoate in a diluent (naphtha) is added at the inlet point of the reactor.

The molecular weight of the products was adjusted in such a way with the molecular weight regulator that the melt index was 10 g/10 min (determined in accordance with German Standard Specification DIN 53,735).

EXAMPLE 1

5.1 l/h of acrylic acid and 2.7 l/h of tri-n-butylamine were metered in together with 2.3 metric t/h of ethylene at the intake side of a high-performance compressor, compressed to the reaction pressure of 2800 bar and heated to 145° C. At the inlet point of the tube reactor, 1.3 ppm/h of tert-butyl perpivalate and 1.1 ppm/h of tert-butyl perisononanoate, based on the ethylene used, were injected to initiate the copolymerization. The maximum temperature was 250° C. The copolymer formed was separated from unconverted ethylene by a conventional separator system and discharged via a simple KE 150 single-screw extruder from Berstorff. The product is very homogeneous and completely colorless. Films produced from this product are free from fisheyes, are very bright and show excellent puncture resistance.

EXAMPLE 2

10.2 l/h of acrylic acid and 40.4 l/h of a mixture of N,N-dimethyl-N-($C_{10}/C_{18}$-alkyl)amine (where $C_{10}/C_{18}$-alkyl is a mixture of alkyls of from 10 to 18 carbon atoms) were metered in together with 2.3 metric t/h ethylene at the intake side of a high-performance compressor, compressed to a reaction pressure of 2800 bar heated and to 145° C. At the inlet point of the tube reactor, 1.5 ppm/h of tert-butyl perpivalate and 1.3 ppm/h of tert-butyl perisononanoate, based on the ethylene used, were injected to initiate the copolymerization. The maximum temperature was 250° C. The copolymer formed was separated from ethylene unconverted by a customary separator system and discharged via a simple KE 150 single-screw extruder from Berstorff. The product is very homogeneous and completely colorless. Films produced from this product are free from fisheyes, are very bright and show excellent puncture resistance.

COMPARATIVE RUN A 5.1 l/h of acrylic acid were metered in together with 2.3 metric t/h of ethylene at the intake side of a high-performance compressor, compressed to a reaction pressure of 2,800 bar and heated to 145° C. At the inlet point of the tube reactor, 1.3 ppm/h of tert-butyl perpivalate and 1.3 ppm/h of tert-butyl perisononanoate, based on the ethylene used, were injected to initiate the copolymerization. The maximum temperature was 250° C. The copolymer formed was separated from unconverted ethylene by a customary separator system and discharged via a simple KE 150 single-screw extruder from Berstorff. Films produced therefrom are very inhomogeneous and contain many fisheyes.

Thereafter the ethylene/acrylic acid copolymer was reacted with tri-n-butylamine by the method described in EP-A-193,110 to give the amine-modified ionomer. It still contained many fisheyes, and the puncture resistance was lower than that of the products obtained as described in Example 1.

TABLE

| | Level of fisheyes | Gloss* Scale divisions | DDI** [g] |
|---|---|---|---|
| Example 3 | low | 60 | 80 |
| Comparative run A | high | 20 | 50 |

*Determined in accordance with ASTM D 523/80
**Dart Drop Impact, determined in accordance with ASTM 1709 at an angle of 20°

COMPARATIVE RUN B 10.2 l/h of acrylic acid were metered in together with 2.3 metric t/h of ethylene at the intake side of a high-performance compressor, compressed to the reaction pressure of 2800 bar and heated to 145° C. At the inlet point of the tube reactor, 1.5 ppm/h of tert-butyl perpivalate and 1.3 ppm/h of tert-butyl perisononanoate, based on the ethylene used, were injected to initiate the copolymerization.

It was impossible to isolate any product, since the reactor tubes became clogged very quickly, presumably as a consequence of polyacrylic acid block formation. The subsequent reaction with a tertiary amine could not take place.

We claim:

1. A high molecular weight ethylene copolymer having a melt flow index of less than 40 g/10 min and prepared by copolymerization of ethylene with an $\alpha,\beta$-ethylenically unsaturated acrylic acid, carboxylic anhydride or a derivative thereof in a polymerization system at a pressure of from 500 to 5,000 bar and a temperature of from 40° to 350° C. in the presence of a free-radical polymerization initiator, in the presence or absence of a molecular weight regulator and in the presence of a tertiary organic monoamine.

* * * * *